Patented Nov. 12, 1940

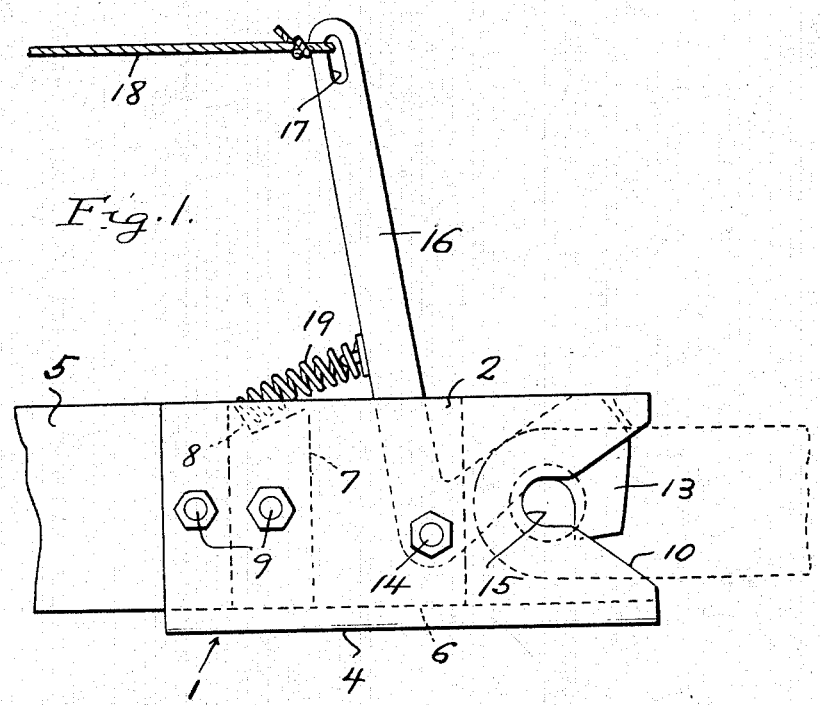
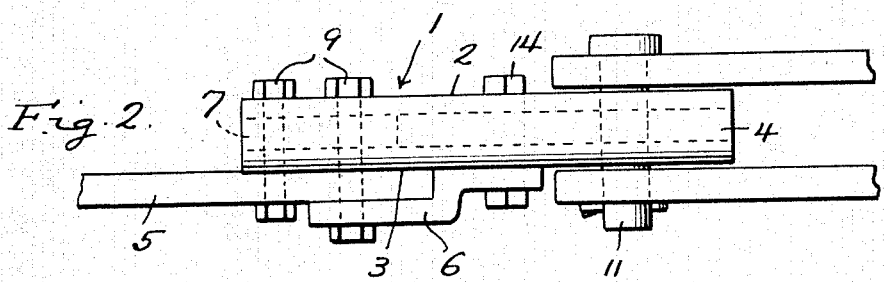
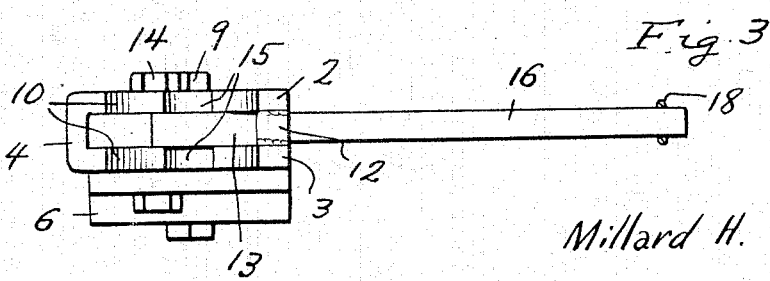

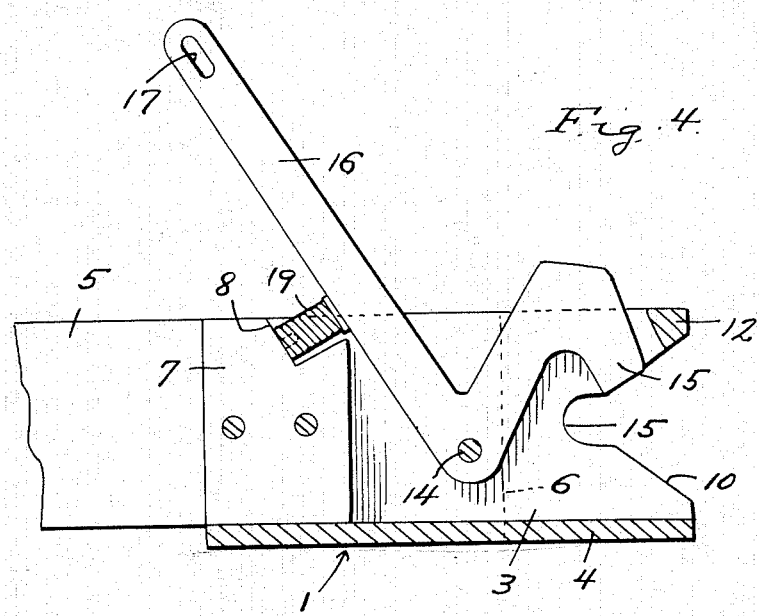
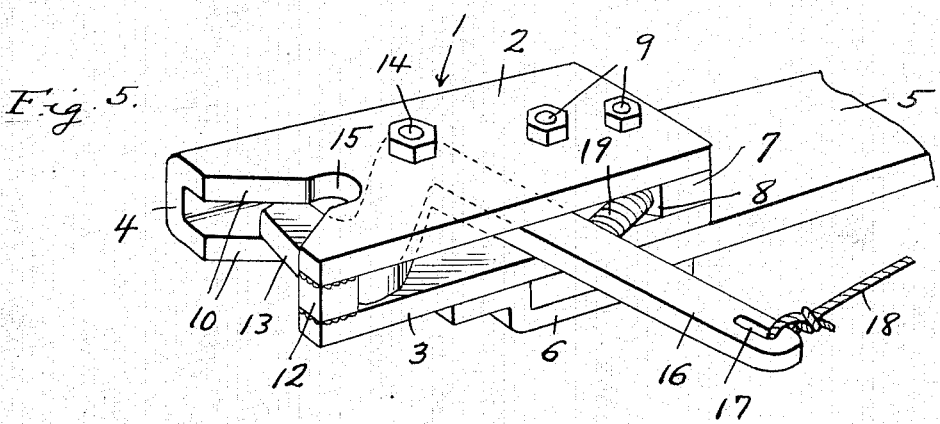
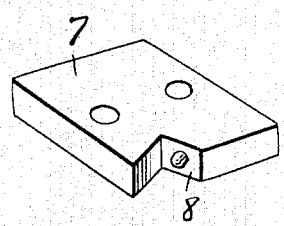

2,221,492

UNITED STATES PATENT OFFICE 2,221,492

TRACTOR HITCH

Millard H. Sawyer, Leland, Ill.

Application March 21, 1940, Serial No. 325,250

1 Claim. (Cl. 280—33.15)

The present invention relates to new and useful improvements in tractor hitches and has for one of its important objects to provide, in a manner as hereinafter set forth, a device of this character which will automatically lock the pin on the stub tongue of a wagon, for example, when said pin is engaged in the hitch.

Another very important object of the invention is to provide a hitch of the aforementioned character which will allow no slack or play, the connection being as firm as though it were made directly with the draw bar of the tractor.

Still another very important object of the invention is to provide a hitch of the character described which will permit the wagon, tractor or other device to be conveniently backed when desired.

Other objects of the invention are to provide a tractor hitch which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a hitch constructed in accordance with the present invention.

Figure 2 is a view in side elevation of the device.

Figure 3 is an elevational view, looking at the rear end of the hitch.

Figure 4 is a view in horizontal section through the device.

Figure 5 is a perspective view.

Figure 6 is a detail view in perspective of one of the spacing elements.

Referring now to the drawings in detail, it will be seen that the embodiments of the invention which has been illustrated comprises a horizontal member 1 of suitable metal, said member being substantially U-shaped in cross section thereby providing a pair of vertically spaced, opposed upper and lower plates 2 and 3, respectively, which are connected on one side by a bight portion 4. The member 1 is secured horizontally on the rear end portion of the tractor draw bar 5 and projects rearwardly therefrom. The draw bar 5 is secured between the lower plate 3 of the member 1 and an angular metallic bracket 6 on said lower plate.

Mounted between the front end portions of the plates 2 and 3 is a metallic spacing element 7. The edge of the element 7 which is adjacent the open side of the member 1 is recessed in a manner to provide a spring seat 8. The bolts 9 which secure the member 1 to the draw bar 5 are also utilized for securing the spacer 7 in position.

The rear end portions of the plates 2 and 3 have formed therein substantially Y-shaped recesses 10. As shown to advantage in Figs. 1 and 2 of the drawings the vertically aligned recesses 10 are adapted to receive the usual pin 11 on the tongue of the wagon. A spacing element 12 is secured in any suitable manner, as by welding, between the rear end portions of the plates 2 and 3 adjacent the open side of the member 1.

The reference numeral 13 designates a latch which is pivotally mounted, as at 14, for swinging movement between the plates 2 and 3. The bill of the latch or hook 13 is adapted to engage behind the pin 11 in a manner to positively secure said pin in the stem or pocket portions 15 of the substantially Y-shaped recesses 10.

On the pivoted end of the latch or hook 13 is an integral lever 16 which projects from between the plates 2 and 3 at the open side of the member 1. The free end portion of the lever 16 is provided with a slot 17 to facilitate attaching to said lever a rope or the like 18 from the operator's seat of the tractor. A coil spring 19 has one end engaged with the seat 8 in the spacer 7 and its other end engaged with the lever 16 for yieldingly urging the latch or hook 13 toward operative or locking position.

It is thought that the manner in which the hitch operates will be readily apparent from a consideration of the foregoing. The latch or hook 13 is normally maintained in operative position across the inner portions of the recesses 10 by the coil spring 19. When the pin 11 enters the recesses 10 it is directed by the converging walls thereof toward the pockets 15 of said recesses. The latch or hook 13 is thus pushed aside against the tension of the coil spring 19, the pin 11 entering the pockets 15. Of course, as soon as the pin 11 passes the bill portion of the latch or hook 13 and enters the pockets 15 said hook or latch is returned to operative position behind said pin by the spring 19. Of course, to release the pin 11 it is only necessary to actuate the lever 16 against the tension of the coil spring 19 through the medium of the rope 18 thereby swinging the latch or hook 13 laterally to inoperative position.

It is believed that the many advantages of a hitch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A hitch comprising a member of substantially U-shaped cross section having recesses therein for the reception of a pin, an angular bracket mounted beneath said member, said bracket and member formed for the reception of a draw bar therebetween, a bolt securing the bracket to the member and passing through said member, a latch journaled on the bolt and operable in the member for releasably securing the pin in the recesses, a lever on the pivoted end of said latch, a spacing element mounted between the opposed walls of the member, a bolt passing through the member, the spacing element and the bracket, the second named bolt constituting common means for securing the spacing element in the member and the draw bar between said member and the bracket, said spacing element having a recess therein adjacent the open side of the member, said recess providing a seat, and a coil spring having one end engaged with the seat and its other end engaged with the lever for yieldingly urging the latch toward operative position.

MILLARD H. SAWYER.